United States Patent [19]

Turi Nagy et al.

[11] 4,119,912
[45] Oct. 10, 1978

[54] AUDIO FREQUENCY HETERODYNE MEANS AND METHOD

[75] Inventors: Janos Turi Nagy, Zug; Felix Niederberger, Cham, both of Switzerland

[73] Assignee: LGZ Landis & Gyr Zug AG, Zug, Switzerland

[21] Appl. No.: 690,098

[22] Filed: May 26, 1976

[30] Foreign Application Priority Data

Jun. 5, 1975 [CH] Switzerland .................. 7239/75

[51] Int. Cl.$^2$ ............................................ H03B 3/08
[52] U.S. Cl. ............................ 325/58; 325/419; 179/15 BP; 358/148
[58] Field of Search .................... 325/58, 4, 63, 419, 325/49, 50, 53, 54; 179/15 BP, 15 BS; 358/148, 149, 150

[56] References Cited

U.S. PATENT DOCUMENTS

| | | | |
|---|---|---|---|
| 2,033,237 | 3/1936 | Gannett | 325/58 |
| 2,531,199 | 11/1950 | Darling | 325/58 |
| 3,593,138 | 7/1971 | Dunn et al. | 325/4 |
| 3,746,991 | 7/1973 | Gautney | 325/55 |
| 3,927,373 | 12/1975 | Janssens | 325/58 |
| 3,995,111 | 10/1976 | Tsuji et al. | 178/69.5 R |

*Primary Examiner*—Benedict V. Safourek
*Assistant Examiner*—Tommy P. Chin
*Attorney, Agent, or Firm*—Burns, Doane, Swecker & Mathis

[57] ABSTRACT

Means and method for producing, at a plurality locally spaced of transmitting stations, an audio frequency pilot signal to be fed by the stations into a common communication or power transmission network, the pilot signals fed by the stations being synchronous and in phase with one another. The pilot signals are synchronized by a subharmonic frequency signal generated at a central station by frequency division and fed to each of the transmitting stations. At each transmitting station, a phase-locked-loop circuit is employed to set and maintain the pilot signals in phase with the subharmonic frequency signal.

9 Claims, 8 Drawing Figures

AUDIO FREQUENCY HETERODYNE MEANS AND METHOD

BACKGROUND OF THE INVENTION

By a known process, audio frequency pilot signals produced by a central station and transmitted to a plurality of locally spaced transmitting stations are synchronized in phase and transmitted to a common network. The pilot signals are controlled by a control signal, carried by a carrier signal derived as a subharmonic of the line voltage frequency (typically 50 or 60 Hz) and fed to the transmitting stations. The received control signal is synchronized at the transmitting stations by comparison to line voltage frequency. Such a process has been described in German Offenlegungsschrift No. 1,951,444, dated Jan. 28, 1971.

The aforementioned process is characterized by good synchronization and adherence to the phase of the audio-frequencies, a high degree of safety against breakdowns by line voltage harmonics and a low required band width for the transmission between the central station and the individual transmitting stations. However, the process is disadvantageous in that the apparatus necessary for transmitting the control signal in accordance with a carrier frequency process involves considerable expense.

In another known audio-frequency-heterodyne process, described in Nachrichtentechnische Fachberichte 31 (May 1966) pp 51 to 53, a subharmonic of the central control frequency is formed on the transmitting side, receiving a heterodyne process with two frequencies and single-side band transmission of the control frequency on a channel having a band width of 120 Hz. This subharmonic is then converted into two frequencies by multiplication with different factors. These frequencies are then mixed additively after scanning with the scanning frequency and are fed by a channel filter into the transmitting channel. The difference frequency of the two previously mentioned frequencies is formed in the receiver which is identical with the subharmonic and from this is then formed by multiplication the central control frequency scanned with the central controlled program. However, this process like the other known process involves expensive modes of transmitting and receiving.

Accordingly it is a primary object of the present invention to provide an inexpensively realized audio-frequency-heterodyne means and method.

Another object of the present invention is to provide audio-frequency-heterodyne means and method which are not dependant on line voltage frequency.

Yet another object of the present invention is to provide an audio-frequency-heterodyne system which may be fabricated from simple, commercially available integrated circuits.

These and other objects and features of the invention will become apparent from the claims and from the following description when read in conjunction with the appended drawings.

DETAILED DESCRIPTION

An audio-frequency-heterodyne process of an embodiment of the present invention is characterized in that the subharmonic may be between 40 and 60 Hz and may be attained by division of the output signal of a high frequency crystal controlled oscillator; in that a predetermined number of control pulses with the frequency of the subharmonic may succeed every scanning pulse produced in a central station, in that the scanning frequency may be a whole numbered part of the subharmonic and in that the frequency multiplication in the receiver of the transmitting station may be accomplished with the help of the phase-locked-loop technique.

The phase-locked-loop, subsequently called PLL, (phase-synchronizing filter) may include a phase comparing circuit to which the input signal is introduced, a low pass filter following the circuit and a voltage controlled oscillator connected with the output of the low pass filter. The output signal of the oscillator may be fed by way of a frequency converter to the second input of the phase comparator circuit. The method of operation of the PLL will be explained in more detail later on in connection with the frequency multiplication. The audio-frequency-heterodyne process may be performed by an apparatus comprising a quartz controlled oscillator for the formation of a voltage with a high frequency; a frequency divider and a modulator having a frequency divider for the formation of a scanned, controlled frequency; a transmission channel and in every transmission station a correcting network for the transit time; a PLL multiplier for the production of a pilot voltage and a demodulator for the separation scanning pulse.

Figure 1:
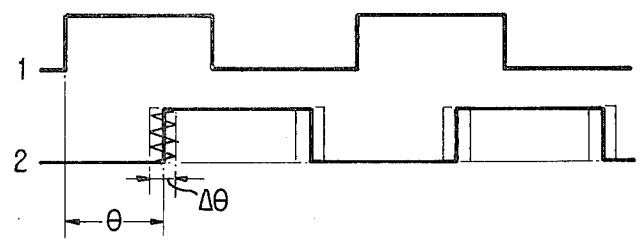
FIG. 1 is a pulse diagram.

The pulse diagram according to FIG. 1 shows the relationship of the transmission of a pulse sequence from one central station to the receivers of a transmitting station. The pulse sequence 1 consists of pulses which are emitted from the central station to the transmitting stations. In the transmitting stations these pulses arrive in the form of the pulses 2 with a delay caused by the characteristics of the transmitting channel by a duration $\theta$. As a result of changes in the transmitting channel, a change $\Delta \theta$ in this delay can occur which must be taken into consideration in the receiver of the transmitting station.

For the control of the transmitting stations by the central station, a pulse program is produced in the central station and is transmitted by way of the transmitting channel. This pulse program consists of pulses with a control frequency and a scanning program for the centrally controlled transmitters. In the receivers of the transmitting stations, this pulse program is received with the central control audio-frequency. From the pulse program the scanning program is obtained and the pilot voltage is produced. The Pilot voltage must be synchronized with the control voltage produced in the central station. Furthermore, the deviation of the phase angle of the control voltage received in the transmitting stations must amount to at most only a degree of the middle value of a maximum long-time drift of ±7°, in order to adapt the pilot voltage of the transmitting stations to the various data of the transmission channels. In order to avoid weakening of the signals in a network fed with the central control audio-frequency from different transmitting stations, it must be possible to vary the phase angle in the receivers of the transmitting stations by 180°.

Figure 2:
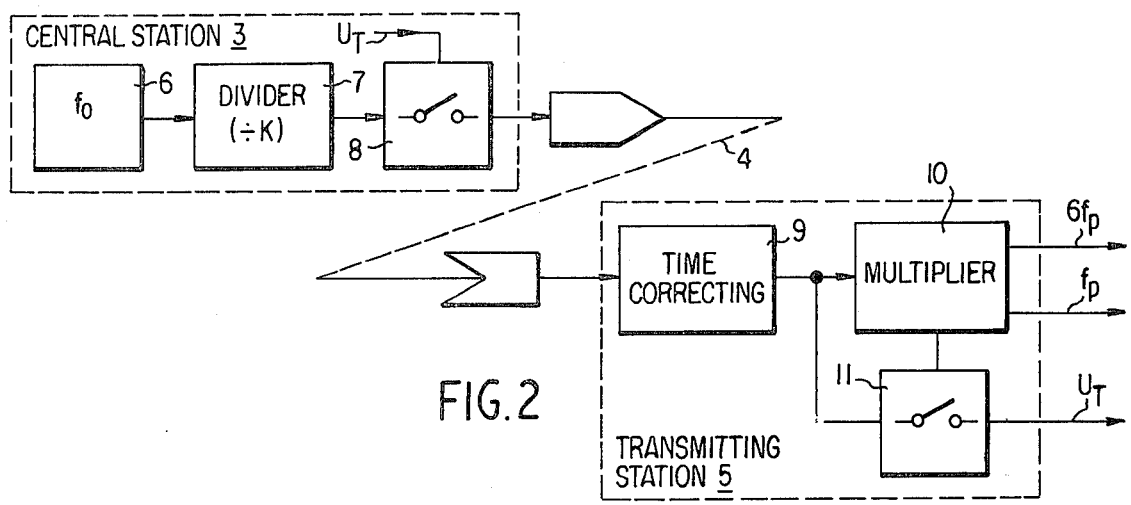
FIG. 2 is a schematic block diagram of a central station of a transmission channel and of a single transmitting station.

In FIG. 2, a central station 3, a transmission channel 4 and a single transmitting station 5 have been shown. The central station 3 controls various transmitting stations 5 distributed over the network that is to be superimposed with the central control audio-frequency by means of a control voltage transmitted via the transmitting channel 4. Subsequently, only one of the similarly equipped transmitting stations 5 will be described for the sake of simplicity.

The central station 3 comprises an oscillator 6, a step down stage 7 and a modulator 8. The oscillator 6 is crystal controlled and produces a relatively high frequency, which in the step down stage 7 is divided to a subharmonic which is common to the oscillator frequency and the central control audio-frequency. The control voltage with the frequency of the subharmonic is scanned in the modulator 8 with the pulse program for the central control. At the same time the scanning frequency is in a whole number division ratio to the frequency of the control voltage, as will be explained in more detail in the explanation of FIG. 4. The transmission channel 4 can be a single remote control channel or a wireless transmission line. It must satisfy the requirements enumerated during the discussion of FIG. 1.

The transmitting station 5 contains a transit time correcting network 9, the output of which is connected with the input of a synchronizing multiplier 10 in the form of a PLL and with a demodulation circuit 11 as well. The transit time correcting network 9 is to equalize the empirical transit time of the control voltage between various transmitting stations 5 in critical positions to the supply mains. The method of operation of the transit time correcting network 9 will be explained during the discussion of FIG. 7. The multiplier 10 produces the synchronized and phase correct pilot voltage for the central control audiofrequency voltage by multiplication from the received control voltage. As a result of the demodulation circuit 11, the scanning program for the central control is separated.

The oscillator 6 may consist of a quartz controlled astable multivibrator of two inverters with a frequency of 1.228 MHz. For the amplification of the oscillator output voltage further stages may be attached.

Figure 3:
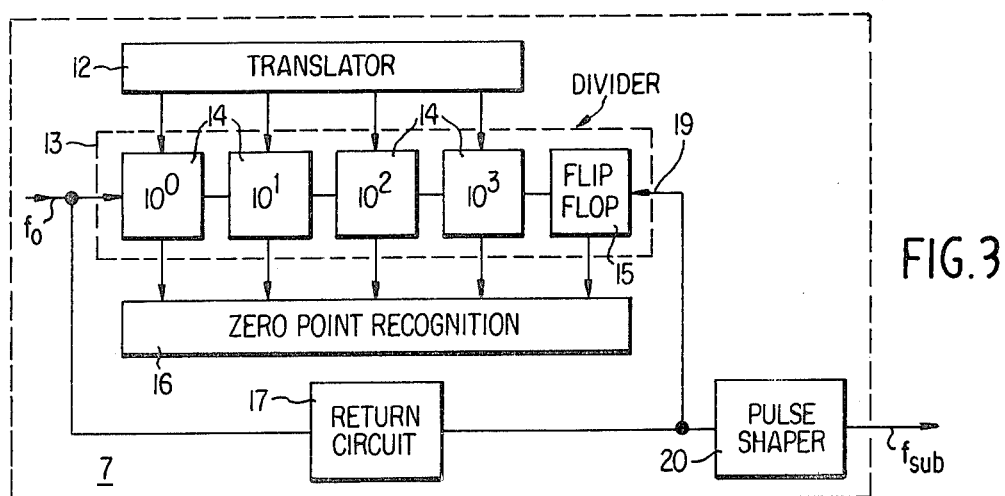
FIG. 3 is a schematic block diagram of a frequency dividing circuit of a central station.

In FIG. 3 an embodiment of the step-down stage 7 of FIG. 2 is shown in the form of a block diagram. A translator 12 in BCD programming has been provided for the modulation of a divider chain 13. The divider chain 13 is built up from four decimal dividers 14 and from a flipflop 15. The decimal dividers 14 are controlled by the translator 12, while the flipflop 15 carries out a division by two. A zero point recognition circuit 16 permits the return of the divider chain 13 after every passage with the help of a return circuit 17. The output is formed by a pulse shaper 20.

The circuit according to FIG. 3 operates as follows: Since the frequency of the oscillator 6 (FIG. 2) has been adjusted firmly to the above mentioned quartz frequency of 1.228 MHz, a control voltage with a frequency between 40 and 60 Hz may be obtained by division with whole numbers. In the transmitting stations 5 a customary central control audio-frequency in the range of 116⅔ Hz to 725 Hz may be obtained by whole number multiplication of the control voltage. Since a constant division by a divisor two may be provided in the central station 3 of FIG. 2 in the first stage (15), the flipflop may be used for this purpose. The decimal dividers 14 may be integrated forward or backward counters, which are adjusted to the desired divisor by the translator 12. The following frequency ratios exist:

$$f_o = 1,228,800 \text{ Hz}$$

$$f_{sub} = f_o/K$$

$$K' = (K/2) - 10^4$$

$$f_p = f_{sub} \cdot M$$

Where:
$f_o$ = oscillator frequency
$f_{sub}$ = subharmonic of the osciallator frequency = control frequency
$K$ = divisor
$K'$ = divisor derived from K
$M$ = factor for the multiplication to pilot frequency
$f_p$ = frequency of the pilot voltage for the central control audio-frequency.

It will be apparent that a control voltage with the frequency of the subharmonic $f_{sub}$ of 58.33 Hz may be obtained from the oscillator frequency $f_o$ of 1,228,800 Hz by division with K = 21,066, where K' = 533. From this control frequency several customary pilot frequencies, for ex. 116⅔, 175, 233⅓, 266⅔ . . . 583⅓ Hz may be formed in the transmitting station 5 of FIG. 2.

The osciallator frequency $f_o$ is fed to the input of the divider chain 13. The division of the oscillator frequency $f_o$ is controlled by the translator 12 and the flipflop 15 in the above mentioned manner. Whenever the adjusted division has been reached, a signal for the return circuit 17 is transmitted by the zero position recognition circuit 16. Said return circuit, after every completion of a cycle may reset the dividers by means of a signal to the input 19 of the flipflop 15 and to the input of the dividers 14; and my deliver a signal with the divider frequency $f_{sub}$, which likewise returns the flipflop 15 of the divider chain 13. The same signal may be divided by two by a flipflop associated with pulse shaper 20 prior to modulation, and thus a signal may be produced with pulses and pulse gaps of equal length.

Figure 4:
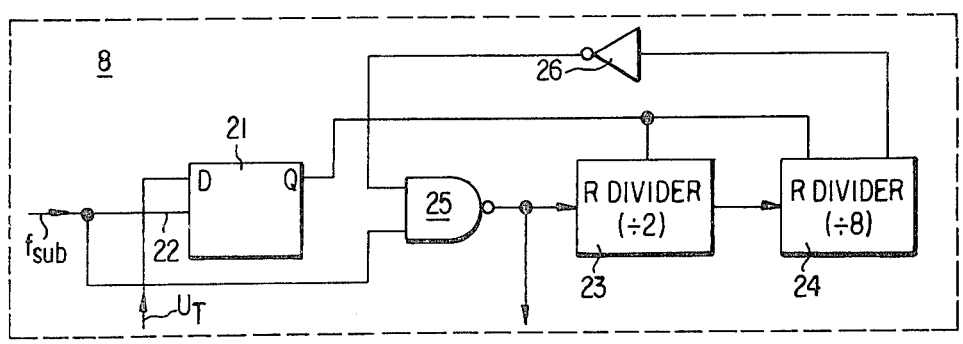
FIG. 4 is a schematic block diagram of a central station modulator.

The modulator 8 of FIG. 4 may consist of a D-flipflop 21, which has an input for the control voltage with a frequency of the subharmonic $f_{sub}$ and a d-input for scanning pulses $U_T$. The Q-output of the flipflop 21 may be connected to the reset inputs R of a binary divider 23 provided for a division with the divisor two, and of a further binary divider 24 provided for a division by eight which is controlled by the divider 23. Furthermore, a first input terminal of NAND gate 25 may be connected to the input terminal 22 of the flipflop 21 and, the second input terminal of said NAND gate may be connected with the output terminal of the binary divider 24 by way of an inverter 26. The output terminal of the NAND gate 25 may be connected to the input terminal of the binary divider 23 and may provide, at the same time, the output signal of the modulator 8.

The modulator 8 of the FIG. 4 operates as follows. The scanning of the control voltage may be accomplished by a scanning signal $U_T$. The leading edge of the scanning signal may prepare the D input of the flipflop 21. The flipflop 21 may be set with the pulse with the frequency of the subharmonic $f_{sub}$ from the output of the step-down stage of the FIG. 3 and as a result of that the binary divider 23 and 24 may be set back. Therefore, during the entire duration of the scanning pulse $U_T$, the pulses with the frequency of the subharmonic $f_{sub}$ appear at the output of the NAND gate 25. The rear edge of the scanning signal $U_T$ may then set back the flipflop 22. The binary dividers 23 and 24 become free as a result of that and count the pulses which subsequently are called equalizing pulses. Thus $2 \cdot 8 = 16$ equalizing pulses occur for each scanning pulse $U_T$. The rear edge of the 16th equalizing impulse set may cause the binary divider 24 to impress a signal on the NAND gate by which the NAND gate 25 is locked. Therefore, for every scanning pulse $U_T$, 16 equalizing pulses may be produced which are attached to every scanned group of the control voltage with the frequency of the subharmonic $f_{sub}$, the signal with frequency $f_{sub}$ at the output terminal of the NAND gate appears for the duration of $U_T$ plus 16 pulses. The duration of each scanning pulse $U_T$ is a whole numbered multiple of duration of the pulses with the frequency of the subharmonic $f_{sub}$.

These groups of pulses with the frequency of the subharmonic $f_{sub}$ may be transmitted via the transmission channel 4 to the transmitting stations 5 (FIG. 2), where they are processed for the production of the pilot frequency for the central-control audio-frequency voltage by multiplication and for the separation of the scanning frequency.

The transit time-balancing circuit 9 of the transmitting station 5 of FIG. 1 consists of a monostable multivibrator with a standard and inverted input and output. The method of operation of this becomes clear from the pulse diagram of FIG. 5 in conjunction with the multiplier 10 of FIG. 6. The transit time-balancing circuit 9 may be designed so that it can balance transit time differences with a phase angle differential of ±175°.

Figure 5:
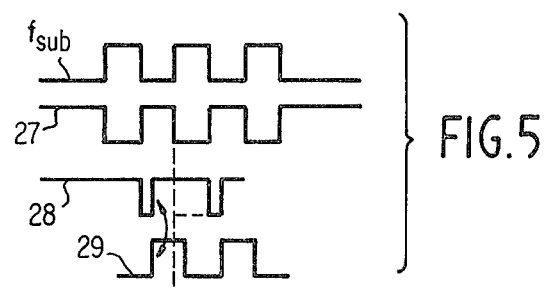
FIG. 5 is a pulse diagram.
Figure 6:
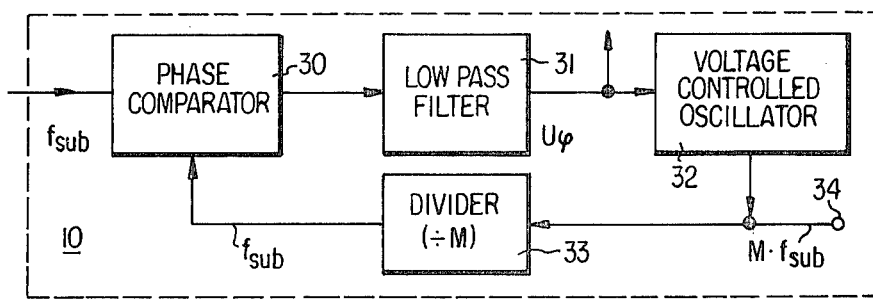
FIG. 6 is a schematic block diagram of a multiplier in the receiver of a transmitting station.

The pulse sequence 27 of FIG. 5 represents the inverted pulses with the frequency of the subharmonic $f_{sub}$. The monostable multivibrator may be set (adjusted) by the leading edge of the inverted pulse 27, therefore by the pulse width of the original pulse with the frequency $f_{sub}$. After a certain time determined by an adjustable RC member, it tilts back into the starting position. The signal occurring at the inverting output of this monostable multivibrator has been designated with the reference number 28. As a result of adjusting the RC member of the multivibrator, the transit time differences of the central control signals in the network that is to be modulated, are balanced. The PLL of the multiplier 10 shown in FIG. 8 may be latched as a result of the leading edge of the output signal 28 of the monostable multivibrator. The corresponding train of pulses of the PLL is designated by the reference number 29.

The multiplier 10, which may be located in the transmitting station 5 (FIG. 2), serves the purpose of forming the pilot voltage with the central control audio-frequency $f_p$ in phase with the arriving control pulses. The multiplier 10 is shown schematically in FIG. 6. It consists of a PLL with a phase comparator circuit 30, a low pass filter 31, a voltage controlled oscillator 32 and a divider circuit 33.

Basically, a PLL represents a control loop and may serve the purpose of bringing the frequency and phase position of a regulable oscillator into a firm relationship with the frequency, and phase of an input signal. The input and output frequencies of the PLL can be equal or they can be at a whole number ratio in relation to one another. Therefore, this circuit among others can be used as a phase synchronized oscillator, as a multiplier or as a frequency divider. In the circuit according to FIG. 6, the PLL may effect frequency multiplication by a factor M.

The control pulses with the frequency of the subharmonic $f_{sub}$, received in the transmitting station, may be fed to the phase comparator circuit 30 in the PLL. The output voltage of said circuit is filtered by means of the low pass filter 31 for the purpose of forming a medium value. Its output voltage $U_T$, dependent on the phase deviation, may be fed to the voltage controlled oscillator 32 and brings the latter in a phase-correct manner to a multiple of the frequency of the subharmonic $f_{sub}$. The oscillator 32 may oscillate with a frequency of $M \cdot f_{sub}$. Its synchronized output voltage is divided again in the divider circuit 33 by the divisor M and is fed to a second input of the phase comparator circuit 30, where the comparison with the phase of the first input voltage then takes place again. At the output 34 of the PLL there appears a pilot voltage with the frequency of $f_p = f_{sub} \cdot M$, which is in phase with the control voltage of the frequency $f_{sub}$. In the frequency the pilot voltage corresponds to the central control audio-frequency.

Figure 7:
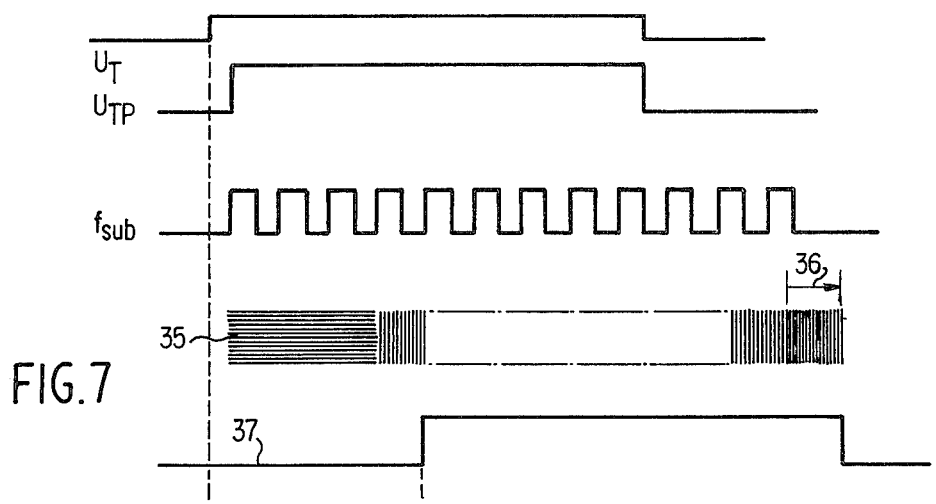
FIG. 7 is a pulse diagram and FIG. 8 is a schematic block diagram of a demodulation circuit in the receiver of a transmitting station.

In the pulse diagram of FIG. 7 a scanning pulse $U_T$ emitted by the central station 3 of FIG. 2 and a scanning pulse $U_{TP}$ received in the transmitting station 5 of the FIG. 3 have been shown. Because of the transit time in the transmission channel 4 (FIG. 2) they may be phase shifted in relation to one another. Each scanning pulse $U_T$ and $U_{TP}$ consists of a whole number of pulses in sequence with the frequency of the subharmonic $f_{sub}$. Because of the transient oscillations which may be caused, inter alia, by the low pass filter 31 of the FIG. 6, the PLL has a certain starting duration during which the phase locking of the frequency does not yet reliably occur. This condition of the pulse sequence 35 has been shown by a horizontal shading. Therefore, care must be taken, that the production of the scanning pulses $U_T$ and of the pilot voltage with the frequency $f_p$ is delayed until the PLL operates stably in the locked state. Furthermore at the end of the drive of the PLL during the duration (time) designated by a tight vertical shading and by the reference number 36, a final oscillation of the PLL takes place, and this state too must be taken into consideration. The scanning pulse at the outlet terminal of the demodulation circuit 11 (FIG. 2) is therefore shifted by a fixed number of pulses with the frequency of the subharmonic $f_{sub}$ in relation to the incoming pulses, as indicated by the pulse train 37. The 16 equalizing pulses following the scanning pulses $U_T$ produced in the central station 3 (FIG. 2) may serve this purpose. Furthermore the pulse lost in the equalizing circuit 9 (FIG. 2), the running time and the dying out time of the PLL may be taken into consideration whenever the scanning pulses $U_T$ are to be separated from the control voltage which happens in the demodulation circuit 11 of the FIG. 8.

Figure 8:
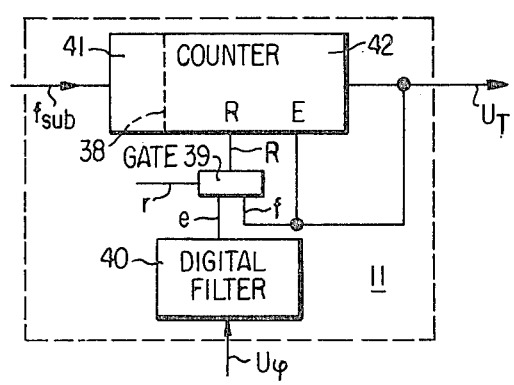

The demodulation circuit 11 of FIG. 8 includes a counter 38, an inhibitor (gate) 39 and a digital filter 40. The demodulation circuit 11 may be controlled by the output voltage $U_T$ of the low pass filter 31 of FIG. 6 and by the control pulses with the frequency $f_{sub}$ from the output of the running time-synchronizing circuit 9 of FIG. 2. The counter 38 may preferably be divided into two parts, namely into a flipflop 41 and into a decade counter 42 which is programmed in correspondence to the total divider ratio.

The demodulation circuit 11 operates as follows: It is assumed that the PLL is securely locked after about 12 pulses with the frequency of the subharmonic $f_{sub}$. In order to increase the security however, still a few additional pulses may be taken into consideration during the evaluation of the scanning pulse $U_T$. The number of the transmitted equalizing pulses is selected correspondingly. Therefore, the counter 38 is adjusted for a divider ratio of $16 + 2 = 18$. Sixteen pulses correspond to the equalizing pulses and one pulse each to the pulse which had been lost in the running time-equalizing circuit 9 of FIG. 2 and to the pulse developing during the decay of the PLL. The scanning pulses $U_T$ obtained for the scanning of the pilot voltage may therefore be delayed by the duration of the number of control pulses with the frequency of the subharmonic $f_{sub}$, determined by the counter 38 as compared to those received in the transmitting stations 5 (FIG. 2). This is indicated in the waveform 37 of FIG. 7. For these reasons, the leading edge of only the eighteenth controlled pulse with the frequency of the subharmonic $f_{sub}$ is evaluated in case of obtaining the scanning pulse $U_T$. As a result of that, the output of the counter 38 is set for the H-signal. The counter 38 may be locked as a result of this H-signal at the input E (Enable) for such a length of time, until it is again returned by a signal on the return input designated by R. This return is controlled by means of an inhibitor (gate) 39 by the voltage $U_T$ taken off from the output of the low pass filter 31 of the PLL of FIG. 6, which voltage may be filtered for a better suppression of the harmonic during the transient period by the digital filter 40. Said inhibitor delivers a return signal according to the equation $$R = r + (e \cdot f)$$

where:
R = return pulse for the counter 38
r = total return pulse prior to beginning of every scanning program
e = $U_\phi$ of the PLL
f = release of $U_\phi$ after 18 pulses with the frequency $f_{sub}$
The signal $U_\phi$-e concludes the scanning pulse $U_T$, whereby the decay of the PLL is taken into consideration. Thus, one will obtain at the output of the counter 38 the scanning pulse $U_T$, which may be used for the scanning of the pilot voltage with the frequency $f_p$ directly in a closed amplifier not shown in the drawing, equipped e.g. with an inverter for the production of the central control pulses.

In case that a three-phase inverter consisting in each phase of a controllable semiconductor or groups of semiconductors (in accordance e.g. with the Swiss Pat. No. 432,626) is provided as an amplifier, a special connection can be disposed in the output of the PLL according to FIG. 2, which delivers pulses with the frequency $6 f_p$ to the successive control of the controllable rectifier. By a corresponding tap on the divider circuit 33 of the PLL of FIG. 6, this can be made possible easily.

As a result of the process described, only a single channel may be needed for the transmission of the control pulses, since both the control voltage as well as the scanning pulses for the central control auxiliary program are available in the transmitted control pulses. Furthermore, it is particularly suitable for a construction with integrated construction units both in the central station as well as in the transmitting stations. As a result of the PLL, the frequency of the pilot voltage can be synchronized in a simple manner with the control pulses. The balancing (equalization) of the differences in running time can be accomplished with an extremely simple circuit. The use of equalizing pulses with the control frequency in conjunction with the scanning pulses offer a safe operation of the PLL in the multiplier of the transmitting stations. Finally, the process may permit the use of selective filters in the central control receivers distributed in the system, since the control frequency and the central control audio-frequency dependent on it are stable and are not influenced by oscillations of the mains frequency. As a result interfering voltages in the network, especially as a result of harmonics of the mains frequency, may have less of an effect on the central control receivers.

The principles, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. An apparatus for providing a specific one of a possible plurality of synchronous, in-phase audio-frequency pilot signals to a common power mains network at a plurality of ripple control transmitting stations and for transmitting gating pulses comprising:
 a central station for providing a control signal including a sequence of pulses with a frequency which is a subharmonic of a specific one of a possible plurality of synchronous in-phase audio-frequency pilot signals including:
    a high frequency, crystal controlled oscillator, a frequency divider for reducing the frequency of the output signal of the oscillator to the subharmonic frequency,
    and
    means for modulating the output signal of the frequency divider responsive to said gating pulses; and,
 a plurality of ripple control transmitting stations, feeding the common power mains network and receiving the control signal from the central station, each of which transmitting stations including:
    means for equalizing the transit time of the control signal to each transmitting station,
    a multiplier circuit operatively connected to said transit time equalizing means for multiplying the frequency fo the subharmonic signal to generate the pilot signal fed to the network, including a phase-locked-loop circuit, and
    a demodulator operatively connected to said multiplier circuit for separating said gating pulses from the control signal.

2. The apparatus of claim 1, wherein the frequency divider is controlled by a translator and a zero state recognition circuit.

3. The apparatus of claim 2, wherein the frequency divider includes a flipflop for the fixed division of the first decimal place by two of a decimal divider which is controlled by the translator.

4. The apparatus of claim 1 wherein the divider output is formed by a pulse shaper.

5. The apparatus of claim 1 wherein the modulating means of the central station includes means for adding a predetermined number of pulses of the frequency of the subharmonic signal to the sequence of pulses.

6. The apparatus of claim 1 wherein the equalizing means includes a monostable multivibrator connected to an adjustable RC member.

7. The apparatus of claim 1 wherein the multiplier includes a controllable oscillator which is tuned to the pilot signal frequency and a divider circuit of the phase-locked-loop circuit which reduces the frequency of the output signal of the controllable oscillator to the frequency of the control signal which output signal of the divider circuit is fed to a phase comparator circuit.

8. The apparatus of claim 7 wherein the divider circuit has a tap at which a signal with a frequency six times that of the pilot signal can be taken off.

9. The apparatus of claim 1 wherein demodulator of the transmitting stations includes a digital filter and a gate controlled by a pulse counter.

* * * * *